United States Patent [19]
Orszullok

[11] 4,256,163
[45] Mar. 17, 1981

[54] VALVE CARTRIDGE

[75] Inventor: Willy Orszullok, Altena, Fed. Rep. of Germany

[73] Assignee: Friedrich Grohe Armaturenfabrik GmbH & Co., Hemer, Fed. Rep. of Germany

[21] Appl. No.: 78,955

[22] Filed: Sep. 26, 1979

[51] Int. Cl.³ .............................................. F03B 3/00
[52] U.S. Cl. ........................ 137/625.31; 137/625.46; 137/454.5; 251/304
[58] Field of Search ...................... 137/625.31, 625.46, 137/454.5; 251/304; 285/133 R

[56] References Cited

U.S. PATENT DOCUMENTS

| | | | |
|---|---|---|---|
| 2,658,716 | 11/1953 | Winfree | 137/454.5 X |
| 3,082,786 | 3/1963 | McLean | 137/454.5 |
| 3,980,112 | 9/1976 | Basham | 285/133 R X |

*Primary Examiner*—Harold W. Weakley
*Attorney, Agent, or Firm*—James B. Raden; Donald J. Lenkszus

[57] ABSTRACT

A valve cartridge which is particularly suited for replacing valve assemblies of the type utilizing axially movable valve cones, includes a valve disk arrangement. The cartridge housing includes an upper portion adapted to extend above a valve housing and a lower portion adapted to extend into the valve housing. The upper portion contains a valve seat disk and a valve regulating disk. The valve seat disk has a centrally located inflow aperture and a plurality of outflow apertures positioned diametrically outward of the inflow aperture. The lower portion of the cartridge includes a central inflow pipe adapted to engage the fluid inflow passage of the valve housing and is in communication with the inflow aperture of the valve seat disk. The lower portion further includes an outflow pipe concentric with and of shorter length then the inflow pipe. The outflow pipe is in fluid communication with the outflow apertures and the outlet of the valve body.

11 Claims, 5 Drawing Figures

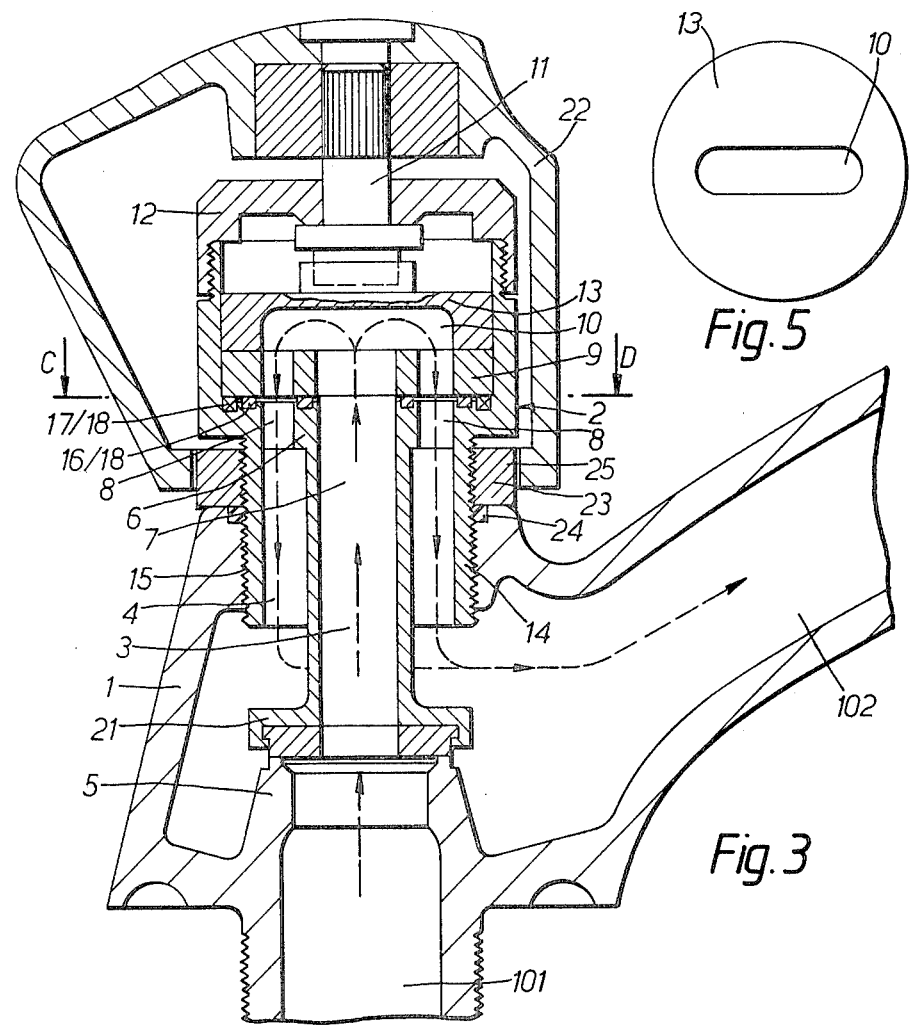
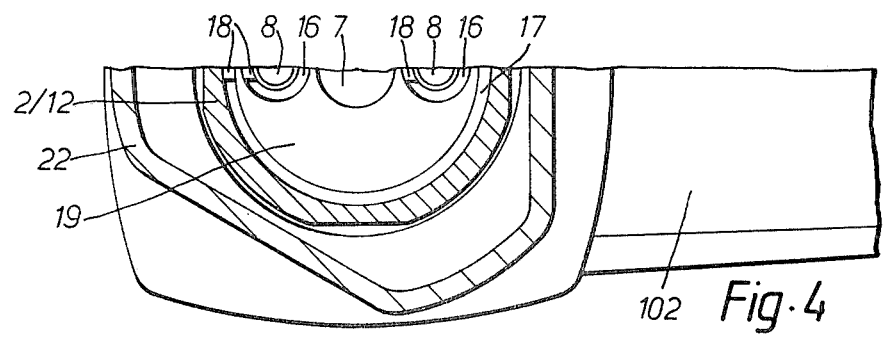

4,256,163

VALVE CARTRIDGE

BACKGROUND OF THE INVENTION

1. Field of the Invention

This invention relates to valve devices, in general, and to valve devices for sanitary engineering applications wherein valve disks are utilized, in particular.

2. Description of the Prior Art

Valving devices utilizing a flat valve seat disk having through apertures for the fluid medium wherein the valve seat disk is immovably held in a valve housing and utilizing a second movable flat regulating valve disk are generally known. Such devices are, for example, shown in German Patent Specification PS No. 337,603 and U.S. Pat. No. 2,583,869.

In the aforementioned U.S. patent, the valve disks are mounted in a cartridge-like assembly which is particularly adapted to be mounted in a valve housing. The structure shown is not particularly well adapted for use as a replacement valve cartridge in other valve assemblies.

It would be desirable to provide a structure which would permit optimum placement of the valve disks relative to each other and may be used in existing valves such as valves which utilize an axial movable sealing cone.

SUMMARY OF THE INVENTION

In accordance with the principles of the invention, a valve cartridge is provided which carries valve disks as the fluid controlling elements and which is particularly well adapted for use in replacing valves of other similar or other types. The valve cartridge includes a special housing having an upper portion of expanded cross-section which is adapted to extend above the valve housing and a lower portion or reduced cross-section which is adapted to extend into the valve housing. The upper portion carries the valve disk elements arranged in optimum relationship such that large through-flow volumes can be obtained with favorable flow behavior. The lower portion is adapted to accommodate inflow and outflow pipes. Advantageously, the lower portion is formed such that it may mate with the valve body of standard valves originally designed for use with axially movable valve cones.

A further advantage of a valve cartridge in accordance with the principles of the invention is that fluid inflow is via a centrally formed pipe, in the lower portion, the lower end of which provides a connection to the valve seat of a standard valve.

Further in accordance with the invention, seals may be arranged at the base of the upper portion such that a pressure surface is provided at the valve seat disk for the incoming fluid medium which is greater than that of the valve regulating disk so that the valve seat is pressed against the valve regulating disk as a function of the pressure of the inflowing fluid medium.

BRIEF DESCRIPTION OF THE DRAWINGS

The invention may be better understood from a reading of the following detailed description in conjunction with the drawings wherein like reference numerals indicate like parts and in which:

FIG. 3 illustrates in cross-section a faucet valve incorporating a second embodiment of the invention;

FIG. 4 is a partial cross-section of the apparatus of FIG. 3 on the plane C–D shown in FIG. 3; and FIG. 5 is a bottom view of a valve regulating disk.

DETAILED DESCRIPTION OF THE DRAWINGS

Figure 1:
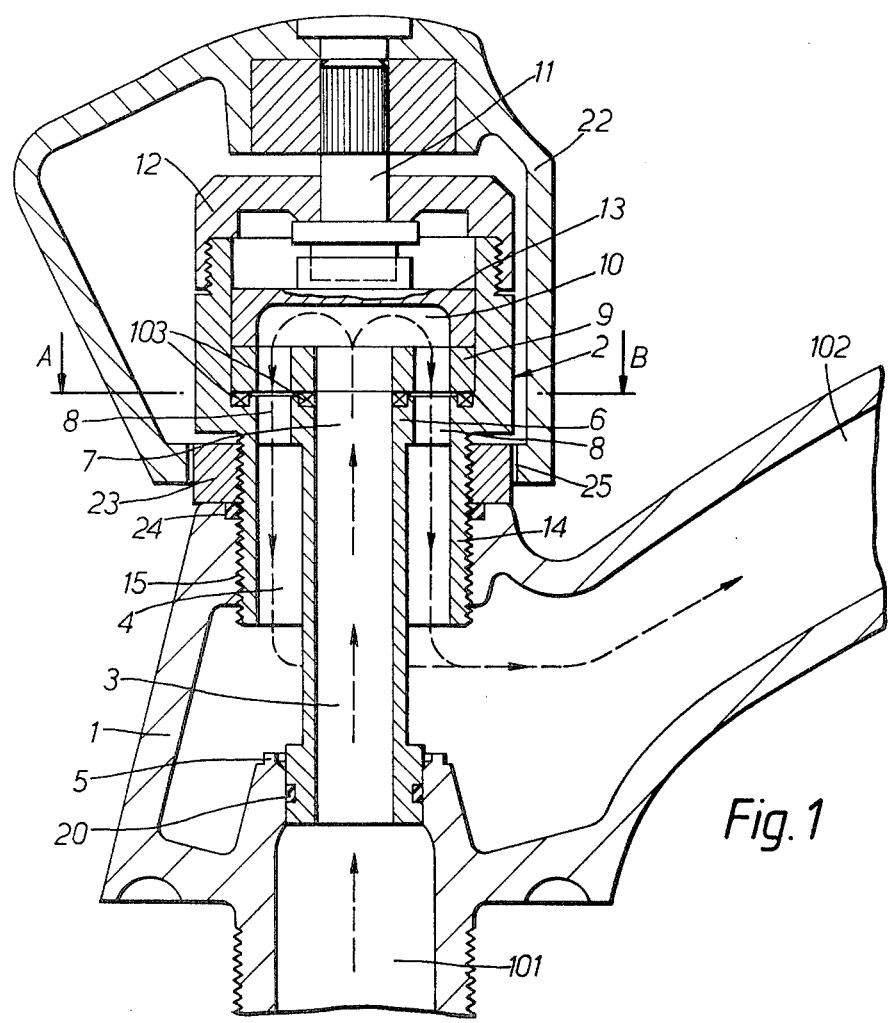
FIG. 1 illustrates in cross-section a faucet valve incorporating a valve arrangement in accordance with the invention.
Figure 2:
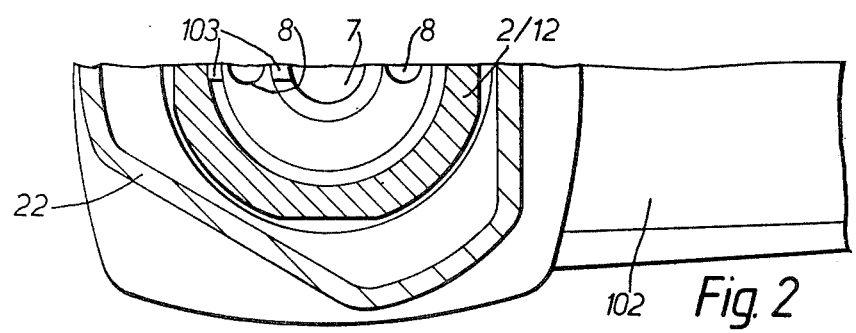
FIG. 2 is a partial cross-section of the apparatus of FIG. 1 on the plane A–B shown in FIG. 1.

The faucet or tap valve shown in FIGS. 1 and 2 consists of a valve housing 1 with a securing and connection socket 101 and a spout 102. The valve housing 1 is also designed for operation with a top valve part (standard top part) with axially movable valve cone (not shown). For this reason, a thread 15 and a valve seat 5, such as are required for opertion using what is known as a standard top part, are provided in the valve housing 1.

A valve cartridge (herein referred to as a special housing) 2 is screwed into the valve housing 1 and is secured in a leak-tight manner in its required position by means of a lock nut 23 and a sealing ring 24. A coaxially designed inflow pipe 3 is fed into a central bore in the valve seat 5 and sealed at the outer surface by means of an O-ring 20.

Approximately at its center, the special housing 2 has a base 6 with a central inflow aperature 7 which is connected to the valve seat 5 by the inflow pipe 3. Two outflow apertures 8 are provided in the base diagonally opposite the inflow. aperature 7. At the side of the base 6 adjacent the inflow pipe 3, two concentrically arranged seals 103 are recessed and a valve seat disk 9 with the appropriate inflow and outflow apertures is positioned in a leak-tight manner and is incapable of rotation. The upper end wall of the valve seat disk interacts with a valve regulating disk 13. The valve regulating disk presses down upon the valve seat disk and is movable by means of a rotating spindle 11. A flow passage 10 more clearly shown in FIG. 5 is recessed into the surface of disk 13. The flow passage 10 provides the means by which the outflow apertures 8 can be closed or opened to a lesser or greater extent depending upon the rotational position of the valve regulating disk B. The contact pressure for the valve regulating disk is brought about by a bell-shaped housing 12 forming part of the special housing 2 in which the rotating spindle 11 is also mounted. The bell-shaped housing 12 is secured to the base by means of a thread. A valve actuating handle 22 is secured to the extreme end of the rotating spindle 11. The handle 22 is cup-shaped and encloses the part of the special housing 2 protruding from the housing 1 of the fitting. Additional rotating support 25 for the valve actuating handle 22 is provided by the outside surface of a lock nut 23 which is cylindrical.

If the connecting and securing socket 101 is now connected to a main supply line which is not shown, the fluid will flow in the direction of the arrows shown in the drawing into the special housing 2. The fluid enters the overflow passage 10 running transverse to the incoming flow direction through the valve seat disk 9. When overflow passage 10 coincides with the outflow apertures 8, the fluid is turned back into the outflow pipe 4 through outflow apertures 8 and passes into the spout 102 of the valve housing 1. If the valve regulating disk 13 is rotated in relation to the valve seat disk 9 by means of the valve actuating handle 22, the through-flow cross-sections are reduced or increased accordingly until the valve is either fully open or fully closed in the respective end positions. The rotational movement can be limited to the range "fully open" to "fully closed" by means of a stop.

The valve device can be dismantled by simply undoing the lock nut 23 and unscrewing the special housing 2 out of the valve housing 1 after cutting off the main supply. It is then possible to screw in a conventional top valve part with an axially movable valve cone into the valve housing 1 and operate the valve by this means.

Another embodiment of the invention is shown in FIGS 3 and 4 which differs in principle from the above example of an embodiment of the invention by the shape of the inflow pipe 3 and the arrangement of seals between the base 6 and the valve seat disk 9.

The inflow pipe 3 is fitted with a plate-shaped sealing disk 21 at the end away from the base 6 so that the sealing disk 21 is pressed tightly against the end face of the valve seat 5.

To enable the contact pressure force of the valve disks 9 and 13 lying one on top of the other to adapt to the pressure of the inflowing fluid, annular grooves 16 are provided in the base 6 concentrically around the outflow apertures 8 and a further annular groove 17 is arranged concentrically around the inflow aperture 7 but enclosing all the apertures in the base 6 recessed to accommodate seals 18 to provide the seal between the base 6 and the valve seat disk 9. This arrangement is most clearly seen in FIG. 4. By this means, a pressure chamber is provided between the base 6 and the valve disk 9 in which the pressure of the incoming medium is brought into effect whereby the pressure surface 19 working upon the valve seat disk 9 is designed to be greater than the pressure surface working upon the valve regulating disk 18. The result thereof is that the valve seat disk is always pressed against the valve regulating disk 13 as a functon of the pressure in the main supply line.

The operation of the embodiment of FIGS. 3 and 4 otherwise corresponds to the operation described for FIGS. 1 and 2.

It is to be understood that the above-described arrangements are illustrative of the principles of this invention. Numerous other arrangements and modifications may be devised by those skilled in the art without departing from the spirit and scope of the invention.

What is claimed is:

1. A valve cartridge adapted for mounting to a valve housing having a fluid inflow passage surrounded by a valve seat area and a fluid outflow passage, said valve cartridge comprising:
   a cartridge housing including an upper portion adapted to extend above said valve housing and a lower portion adapted to extend into said valve housing, a valve seat disk immovably held in said upper portion and having an inflow aperture in communication with said inflow passage and a plurality of outflow apertures in communication with said outflow passage, a regulating valve disk including a flow channel, said regulating valve disk being positioned in said upper portion in cooperative engagement with said valve seat disk, control means for rotatably moving said regulating valve disk, said regulating valve disk being movable to establish a fluid flow path between said inflow and outflow apertures through said flow channel, said lower portion having an outer cylindrical surface, sealing means disposed between said cylindrical surface and said valve body, means for securing said cylindrical surface to said valve body, said lower portion including an outflow pipe intermediate said outflow aperture and said outflow passage and an inflow pipe intermediate said inflow passage and said inflow aperture, and means for providing a seal between said inflow pipe and said inflow passage.

2. A valve cartridge in accordance with claim 1, wherein said cartridge is substantially cylindrical in shape, said inflow pipe is positioned centrally in said lower portion, said outflow pipe is concentric to said inflow pipe and is shorter in length than said inflow pipe.

3. A valve cartridge in accordance with claim 2, wherein said upper portion includes a base portion and a bell-shaped top portion coupled to said base portion, and said control means includes a rotating spindle coupled to said valve regulating disk, said bell-shaped top portion being adapted to guide said rotating spindle.

4. A valve cartridge in accordance with claim 3, wherein said inflow aperture is centrally positioned in said valve seat disk, and said plurality of outflow apertures are positioned diametrically outward of said inflow aperture.

5. A valve cartridge in accordance with claim 4, wherein said base portion includes a surface adapted to receive said valve seat disk, said surface including an inflow bore in communication with said inflow aperture and said inflow pipe, and a plurality of outflow bores in communication with said outflow pipe and said outflow aperture, each of said outflow bores in communication with a corresponding one of said plurality of outflow apertures, said surface including a plurality of first annular grooves, each of said plurality of first annular grooves being positioned concentric to a corresponding one of said outflow bores, and first sealing means disposed in each of said plurality of first annular grooves and in sealing engagement with said valve seat disk.

6. A valve cartridge in accordance with claim 5, wherein said surface includes a second annular groove encompassing said plurality of first annular grooves and said inflow bore, and said valve cartridge further includes second sealing means disposed in said second annular groove in sealing engagement with said valve disk, said first and second sealing means defining a first pressure surface on said valve seat disk, said flow channel defining a second pressure surface on said valve regulating disk, and said first pressure surface being greater than said second pressure surface.

7. A valve cartridge in accordance with claim 6, wherein said inflow pipe includes a portion extending into said valve seat area, said inflow pipe portion including a seal ring, said seal ring being in sealing engagement with said valve seat area.

8. A valve cartridge in accordance with claim 6, wherein said inflow pipe includes a plate-shaped seaing disk in sealing engagement with said valve seat area, said sealing disk including a central aperture in communicaton with the interior of said inflow pipe and said inflow passage.

9. A valve cartridge in accordance with claims 7 and 8, wherein said control means includes a valve actuating handle surrounding said bell-shaped top portion and coupled to said spindle.

10. A valve cartridge in accordance with claim 9, wherein said securing means comprises a threaded surface on said cylindrical surface and a lock nut disposed thereon.

11. A valve cartridge in accordance with claim 10, wherein said lock nut has an outer cylindrical surface adapted to form a rotating guid for said actuating handle.

* * * * *

UNITED STATES PATENT AND TRADEMARK OFFICE
CERTIFICATE OF CORRECTION

PATENT NO. : 4,256,163
DATED : March 17, 1981
INVENTOR(S) : Willy Orszullok

It is certified that error appears in the above-identified patent and that said Letters Patent is hereby corrected as shown below:

On The Title Page insert,

-- (30) Foreign Application Priority Data

Oct. 5, 1978 (DE) Fed. Rep. of Germany...2843481 --.

Signed and Sealed this

Seventeenth Day of August 1982

[SEAL]

Attest:

Attesting Officer

GERALD J. MOSSINGHOFF

Commissioner of Patents and Trademarks